United States Patent [19]

Weiler et al.

[11] 4,445,331
[45] May 1, 1984

[54] LOW-PRESSURE CASING FOR A BRAKE BOOSTER

[75] Inventors: Rolf Weiler, Frankfurt-Sindlingen; Gilbert Bischoff, Hattersheim; Rudolf Schlag, Frankfurt-Sossenheim, all of Fed. Rep. of Germany

[73] Assignee: ITT Industries, Inc., New York, N.Y.

[21] Appl. No.: 307,703

[22] Filed: Oct. 2, 1981

[30] Foreign Application Priority Data

Nov. 6, 1980 [DE] Fed. Rep. of Germany ....... 3041883

[51] Int. Cl.³ .............................................. F16J 11/02
[52] U.S. Cl. ..................................... 60/547.1; 92/169
[58] Field of Search .................... 92/169, 98 R, 98 D; 91/369 A, 369 B, 369 R, 376 R; 60/547.1

[56] References Cited

U.S. PATENT DOCUMENTS

| | | | |
|---|---|---|---|
| 2,438,723 | 7/1948 | Stelzer | 91/376 |
| 2,896,586 | 7/1959 | Ayers, Jr. | 91/376 |
| 3,165,031 | 1/1965 | Rockwell | 92/98 R |
| 3,173,726 | 3/1965 | Valentine et al. | 92/98 R |
| 3,478,519 | 11/1969 | Eggstein | 91/376 R |
| 3,499,288 | 3/1970 | Randol | 91/376 R |

FOREIGN PATENT DOCUMENTS

2922299 12/1979 Fed. Rep. of Germany ... 91/369 A

Primary Examiner—Paul E. Maslousky
Attorney, Agent, or Firm—James B. Raden; Marvin M. Chaban

[57] ABSTRACT

A low-pressure casing for a brake booster for automotive vehicles comprises two casing shells which are sealingly interconnected and include a reinforcement plate at the inner surface of the casing end wall of each casing shell. The reinforcement plate is fastened to the master brake cylinder or to the automotive vehicle by means of fastening bolts. The section of the casing end wall which lies radially outside the reinforcement plate is of truncated-cone-shaped construction and merges into a cylindrical section of the casing. Inserted in the inner of the casing at the transition from the truncated-cone-shaped section into the cylindrical section is a prop ring which is via webs formed integrally with the reinforcement plate.

17 Claims, 11 Drawing Figures

LOW-PRESSURE CASING FOR A BRAKE BOOSTER

BACKGROUND OF THE INVENTION

The present invention relates to a low-pressure casing for a brake booster for use in automotive vehicles comprising two casing shells which are sealingly interconnected and each including a casing end wall and a substantially cylindrical circumferential section of the casing, and a circular reinforcement plate abutting the inner side of one of the casing end wall and fastened to a master brake cylinder or to the automotive vehicle by means of bolts.

In low-pressure brake boosters for automotive vehicles, the master brake cylinder is fastened to one casing end wall of the low-pressure casing, while the other end wall is fastened to the automotive vehicle, preferably to the splashboard. The brake forces which are transmitted onto the actuating piston of the master brake cylinder when braking will have to be re-transmitted as reaction forces from the master brake cylinder onto the point where the brake booster is fastened to the automotive vehicle. Taking into consideration that these comparatively high tension forces take their course via the low-pressure casing, the low-pressure casing has so far been designed with comparatively thick walls, which acts, however, adversely to a generally desired reduction of the brake booster's weight.

A substantial reduction in weight by a thin-walled low-pressure casing construction may be achieved by having the tension forces transmitted via separate tie elements, for instance, tie bolts (German Patent DE-OS No. 2,845,794) or via a central reinforcement tube which interconnects the two casing end walls (German Patent DE-OS No. 2,837,911). In any case, the sealing of the axially movable wall, at which the boosting force is generated, necessitates additional structural arrangements at the points where these tie elements extend through the movable wall and represents a possible source of failure.

SUMMARY OF THE INVENTION

It is, therefore, an object of the present invention to provide a low-pressure casing of the type referred to hereinabove that, beside a thin-walled and for this reason light-weight construction of the casing, ensures a sufficient amount of rigidity to transmit the forces occurring, without the usable casing interior being impaired by force-transmitting elements, such as tie bolts or a central reinforcement tube. In particular, it has to be also taken into account that the casing end walls are not only subjected to tension forces and, under certain circumstances, bending forces when the brakes are applied, but that they also have to transmit pressure forces caused by the low pressure in the casing.

A feature of the present invention is the provision of a low-pressure casing for a brake booster for use in an automotive vehicle comprising: two casing shells which are sealingly interconnected, each of the casing shells including a substantially cylindrical casing section and a casing end wall sections having a plane central end wall and a truncated-cone shaped section interconnecting the central end wall and the cylindrical casing section, the base of the truncated-cone shaped section being connected to the cylindrical casing section; a circular reinforcement plate abutting against the inner surface of the of the central end wall, the plate being fastened to a selected one of a master brake cylinder and the vehicle by fastening bolts; reinforcement elements disposed in a selected one of truncated-cone shaped section and the reinforcement plate extending in the directions of the base of the truncated-cone shaped sections; and a prop ring disposed within the casing bearing against the inner surface of a circumferential edge of the casing at the transition from the truncated-cone shaped section into the cylindrical casing section.

Compared to the comparatively great amount of expansion resulting when the casing end wall is subjected to bending forces, the tension or pressure forces which are exclusively caused in the casing end wall constructed in accordance with the present invention have as a result only a comparatively small amount of expansion. Therefore, the low-pressure casing may be of a thin-walled and for this reason light-weight construction. Likewise, the pressure forces arising under specific operating conditions do not result in the casing end wall bulging, because these pressure forces are transmitted substantially by the reinforcement elements. At the same time, these reinforcement elements provide the casing end walls with bending resistance so that bending force as well can be received without considerable expansions being caused thereby.

In an improvement of the present invention, depressions are arranged as reinforcement elements in the truncated-cone-shaped section of the casing end wall. These depressions themselves reinforce the thin casing sheet metal and prevent the latter from bulging even when subjected to pressure load. Simultaneously, the depressions are able to form abutment surfaces for the prop ring so that the axial fixation and, in some cases, the fastening of the prop ring is simplified.

In an advantageous improvement of the present invention, webs extending in the direction of the cone's periphery or base are arranged as reinforcement elements, the webs being formed integrally with the reinforcement plate and/or the prop ring. From the point of view of manufacture, these webs can be made more easily than the depressions in the casing end walls. The webs support the prop ring radially relative to the reinforcement plate. For this reason, the prop ring is able to receive a great amount of radial pressure forces even when being of a comparatively light-weight construction without running the risk of being deformed.

A particularly bend-resistant construction of the webs will be achieved by having the rims of the webs folded towards the interior of the low-pressure casing. Suitably, the webs are shaped in U-profile in cross-section, since this profile demands little material in order to affort high rigidity.

When the reinforcement plate is made of sheet metal, a particularly light-weight and yet bend-resistant construction can be attained by having the reinforcement plate include deep-drawn ribs which project to the casing interior and which form a lattice.

The introduction of force and the rotation-preventing fixation of the fastening screws at the reinforcement plate or at the low-pressure casing is effected in a very simple and light-weight construction in that the reinforcement plate includes cup-shaped indentations projecting to the casing interior and each having in their bottom one bore which positively engages the head of a fastening bolt and in that the head of the fastening bolt is supported on a rim of a bore in the casing end wall and bears with a head plate against the surface of the bottom of the cup-shaped indentation, this surface facing the casing interior. In this arrangement, the axial introduction of force takes place mainly at the bottom of the cup-shaped indentation, so that the force is evenly introduced into the reinforcement plate. The support at the casing end wall serves at the same time for attachment of the reinforcement plate to the casing end wall.

A construction which has proved to be particularly favorable includes the head of the fastening bolt having radial cut-in projections with one indentation being provided in a circumferential direction on either side of each cut-in projection. The cut-in projections intrude into the bottom of the cup-shaped indentation when the fastening bolt is inserted in the rim of the bore and arrange for a rotation-preventing fixation of the screw. The material which is displaced by this intrusion can flow into the indentations on both sides.

In another embodiment according to the present invention, the reinforcement plate, the webs and the prop ring are constructed as one integral cast piece or molded piece. Simplification of manufacture is achieved thereby.

The webs arranged as reinforcement elements of the casing end wall may likewise be constructed and inserted as individual elements which bear radially against the reinforcement plate and against the prop ring.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENTS

Figures 1, 2:
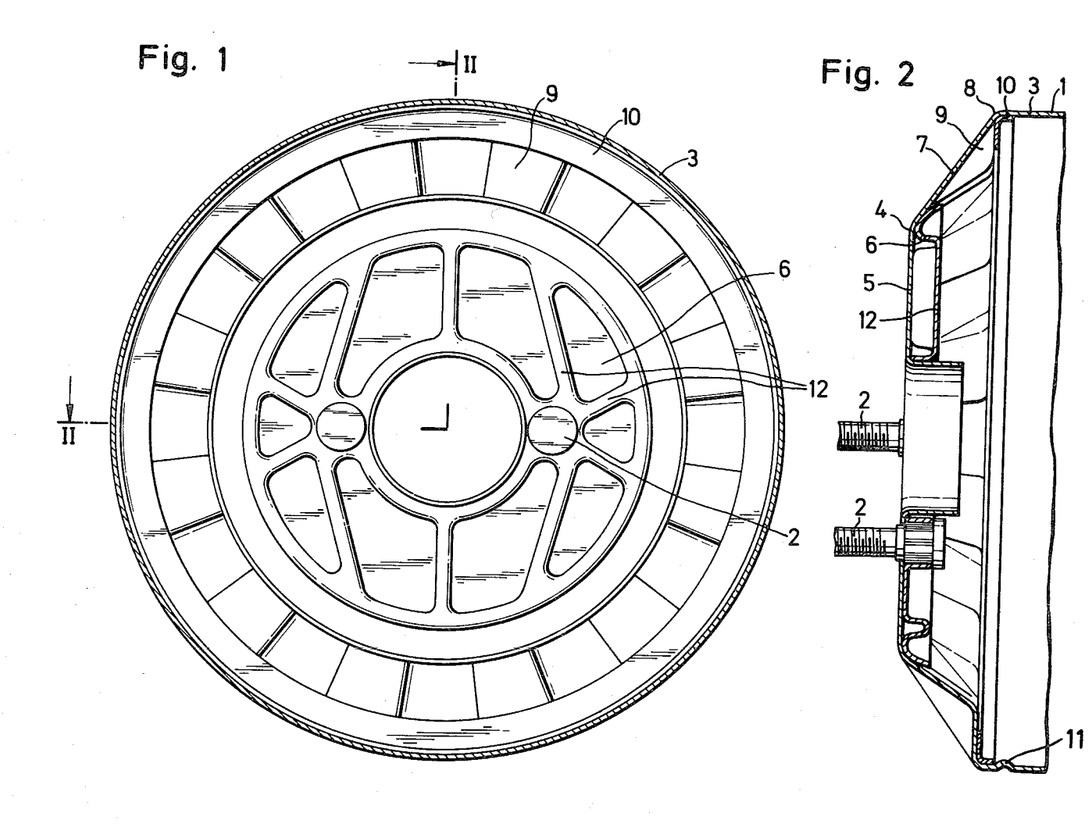
FIG. 1 is an interior end view of a first embodiment of a casing end wall of a low-pressure casing for a brake booster in accordance with the principles of the present invention.
FIG. 2 is a cross sectional view taken along the line II—II FIG. 1.

In FIGS. 1 and 2, one of the two casing shells 1 of a low pressure casing for a brake booster for use in automotive vehicles is shown, that is to say, that casing shell 1 which is fitted to the (not illustrated) master brake cylinder by means of fastening bolts 2. The other casing shell which is connected to the splashboard of an automotive vehicle may be similarly constructed. Casing shell 1 comprises two sheet metal formed members, an end wall 4 and a reinforcement plate 6. The end wall 4 comprises a cylindrical section 3 of the pressure casing and a planar central section 5 joined by a frusto conic or truncated cone end wall section 7 which are deep-drawn from one piece of sheet metal. The casing end wall 4 includes a plane, central end wall section 5 having abutting thereon at the casing inside a reinforcement plate 6 which is also made of sheet metal.

The end wall section 7 which is disposed outside the reinforcement plate 6 is of substantially truncated-cone-shaped construction and merges into the cylindrical section 3 at a circumferential edge 8. Depressions 9 which extend in the direction of the cone's periphery or base are provided as reinforcement elements in the truncated-cone-shaped end wall section 7. At the inside of the circumferential casing edge 8, a prop ring 10 having an angled cross-section is inserted, preferably pressed in, to abut at a supporting surface of depressions 9.

At its side spaced from wall section 5, the prop ring 10 is held by several depressions 11 which are scattered about the periphery and which project inwardly from the cylindrical section 3.

What may be seen particularly from FIG. 1, reinforcement plate 6 includes a lattice of ribs 12 which start mostly from the fastening bolt 2 and extend to the outer edge of the reinforcement plate 6, the latter being likewise constructed as a circumferential rib.

Figure 3:
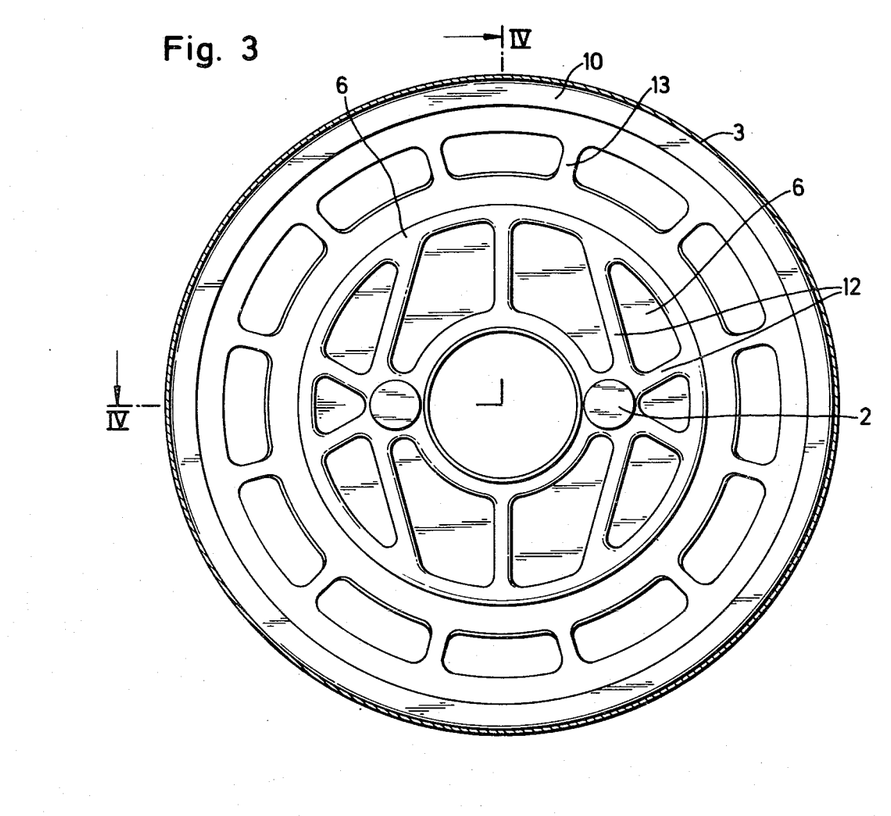
FIG. 3 is an interior end view of a second embodiment of a casing end wall of a low-pressure casing for a brake booster in accordance with the principles of the present invention.
Figure 4:
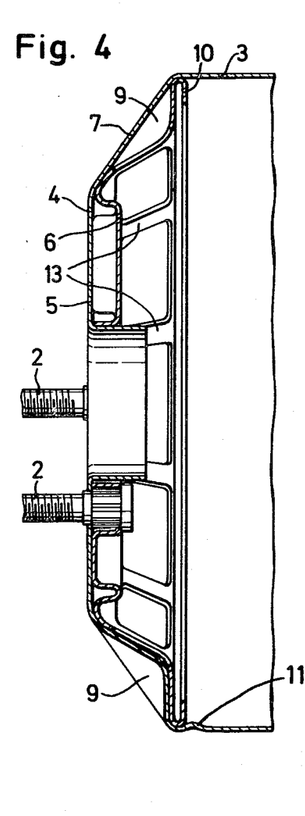
FIG. 4 is a cross sectional view taken along the line IV—IV in FIG. 3.

In contrast to the embodiment of FIGS. 1 and 2, webs 13 are provided as reinforcement elements in addition to the depressions 9 in the embodiment of FIGS. 3 and 4, which webs are formed of sheet metal integrally with reinforcement plate 6 and prop ring 10 and which extend in the direction of the cone's periphery or base.

Figure 5:
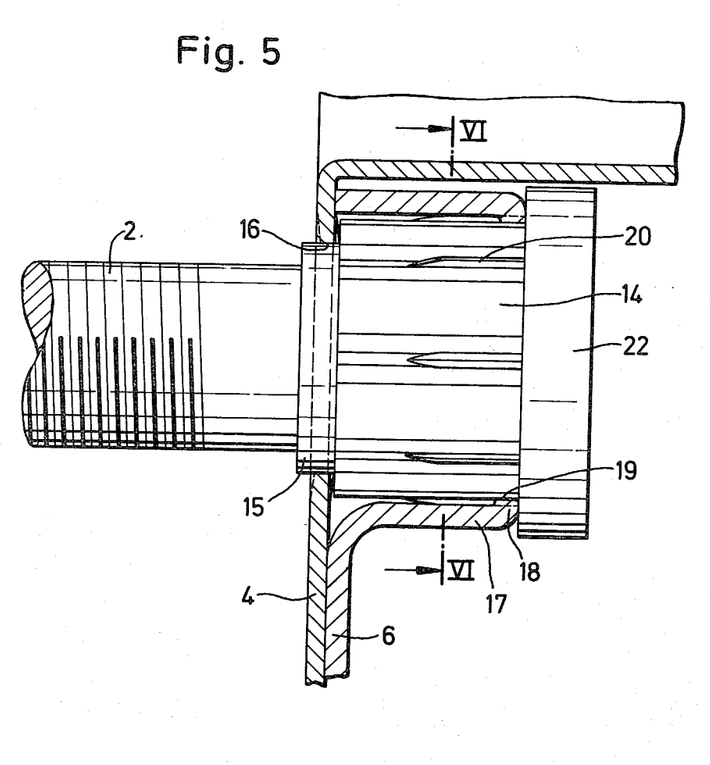
FIG. 5 is an enlarged cross sectional view of the fastening bolt fixed in the casing end wall of FIG. 4.
Figure 6:
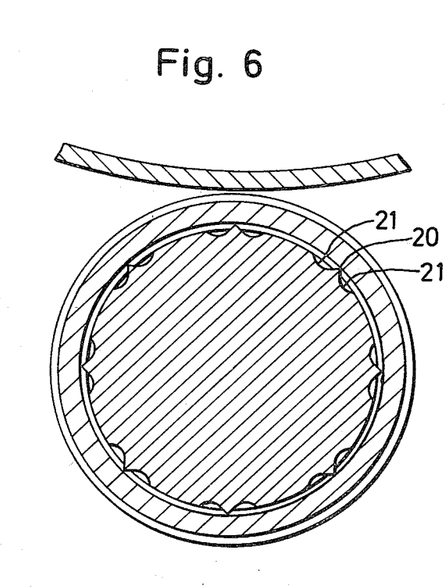
FIG. 6 is a cross sectional view taken along the line VI—VI in FIG. 5.

FIG. 5 shows the construction and the arrangement of the fastening bolt 2 in an enlarged view. Fastening bolt 2 has a substantially cylindrical head 14, which bears with a step 15 on the rim of a bore 16 in the casing end wall 4. This bore rim is welded or sheared with head 14. Head 14 is inserted in a cup-shaped indentation 17 of reinforcement plate 6, the indentation projecting to the casing interior. A bore 19 is provided in the bottom 18 of cup-shaped indentation 17. Scattered about the periphery of head 14 are elongated cut-in projections 20 which dig with their outer edge in the rim of the bore 19 when the fastening bolts are inserted. Arranged for on both sides of each cut-in projection 20 is one indentation 21 (FIG. 6), into which the material of the bore's rim displaced by the cut-in projection 20 may escape.

Head 14 includes a head plate 22 which is supported on the surface of the bottom 18 of the cup-shaped indentation 17, this surface facing the casing interior. Since the step 15 of the head is fixed at the end wall 4, the head plate 22 maintains the reinforcement plate 6 in the predetermined position at the casing end wall 4.

Figure 7:
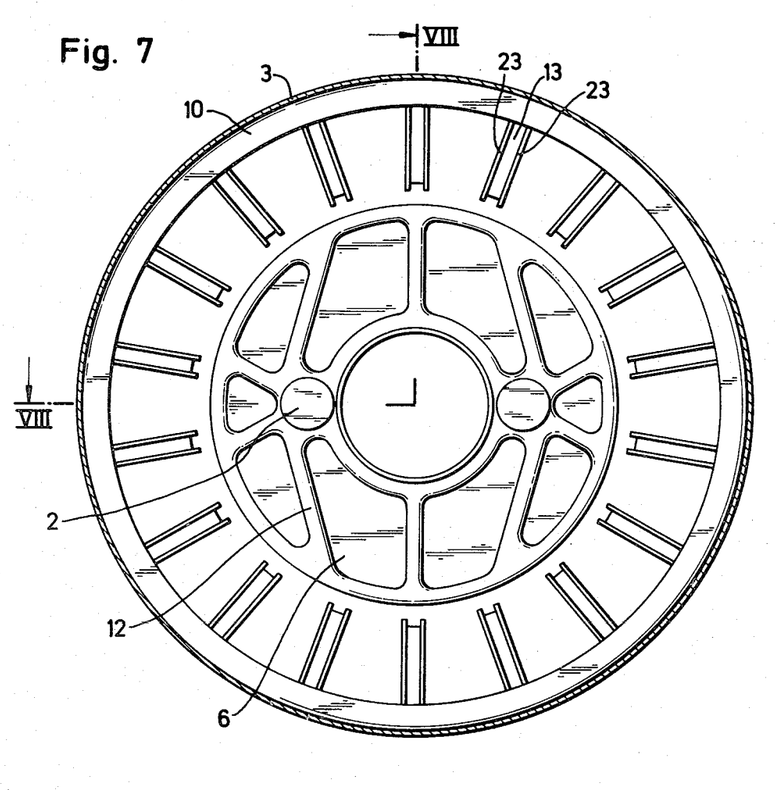
FIG. 7 is an interior end view of a third embodiment of a casing end wall of a low-pressure casing for a brake booster in accordance with the principles of the present invention.
Figure 8:
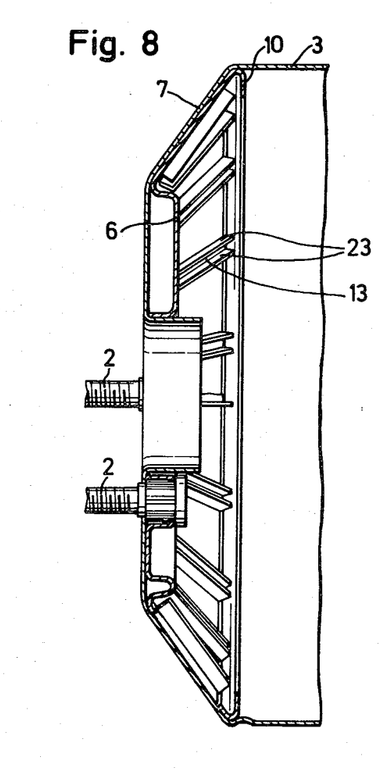
FIG. 8 is a cross sectional view taken along the line VIII—VIII of FIG. 7.

The embodiment according to FIGS. 7 and 8 differs from the embodiment according to FIGS. 3 and 4 in that the webs 13 have edges 23 which are folded towards the interior of the low-pressure casing so that the webs 13 are of U-shaped cross-sectional profile. This affords such an appreciable reinforcement of the webs 13 that there is no need for additional depressions 9 in the truncated-cone-shaped end wall section 7.

Figure 9:
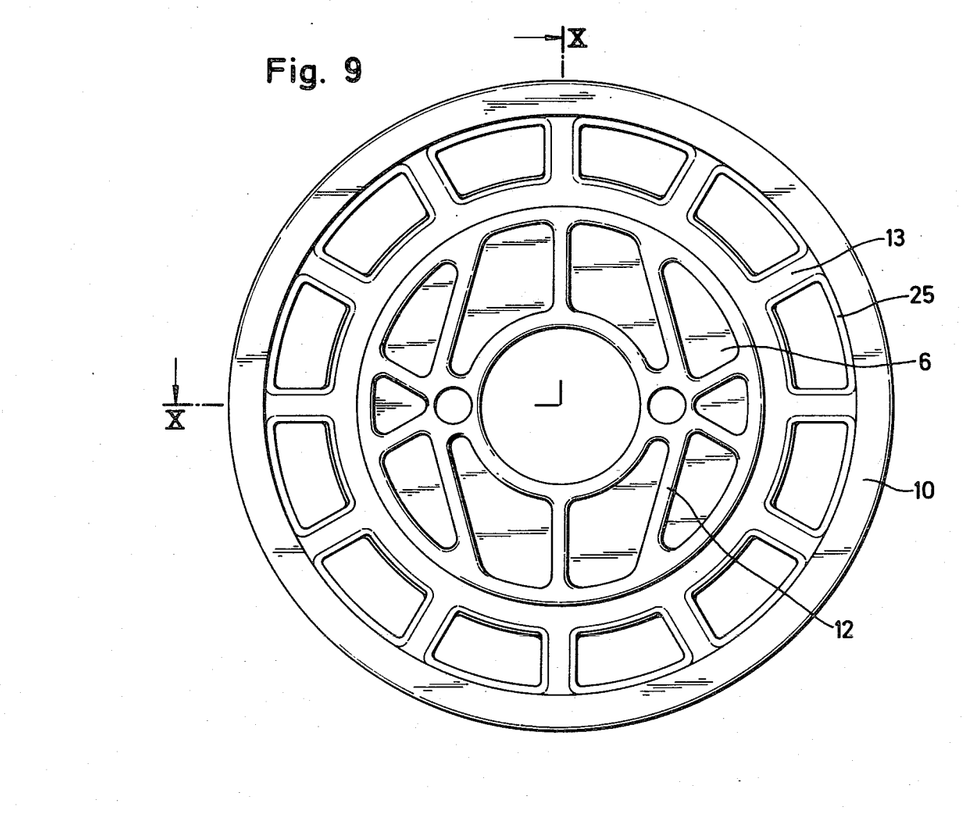
FIG. 9 is an end view of a fourth embodiment of a reinforcement unit composed of a reinforcement plate, webs and a prop ring for a casing end wall of a low-pressure casing for a brake booster in accordance with the principles of the present invention.
Figure 10:
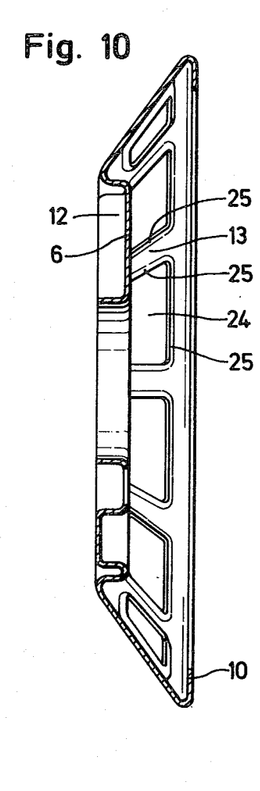
FIG. 10 is a cross sectional view taken along the line X—X in FIG. 9.

In its turn, the embodiment according to FIGS. 9 and 10 differs from the previous embodiments in that openings 24 which are disposed between the webs 13 each have one circumferential reinforcement brim 25 projecting to the casing interior.

Figure 11:
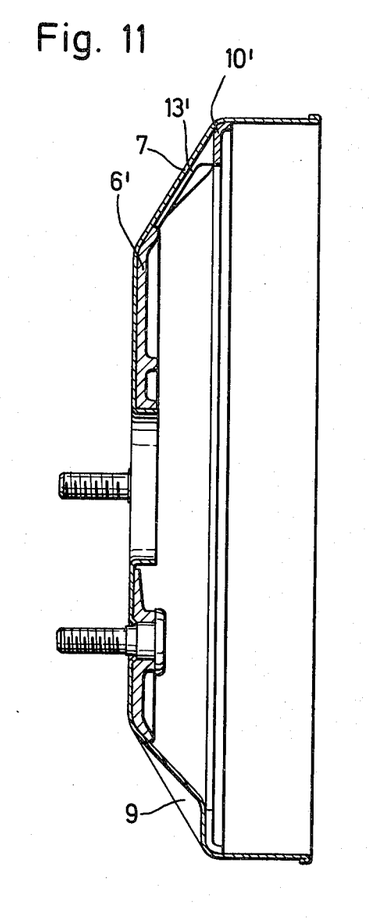
FIG. 11 is a cross sectional view of a fifth embodiment of a casing end wall of a low-pressure casing for a brake booster in accordance with the principles of the present invention wherein the reinforcement plate, the webs and the prop ring are constructed as an integral cast piece.

In the embodiment according to FIG. 11, the reinforcement plate 6', the webs 13' and the prop ring 10' are formed integrally in a cast piece, for example, made from light-metal injection molding. In this arrangement, the depressions 9 extend from the truncated-cone-shaped end wall section 7 inwardly between the webs 13' and form an axial abutment surface for the prop ring 10'—similar to what has been shown in FIG. 2.

While we have described above the principles of our invention in connection with specific apparatus it is to be clearly understood that this description is made only by way of example and not as a limitation to the scope of our invention as set forth in the objects thereof and in the accompanying claims.

We claim:

1. A low-pressure casing shell for a brake booster for use in an automotive vehicle adapted to mate with a second similarly shaped casing shell;
    said two casing shells are designed to be sealingly interconnected, each of said casing shells including a substantially cylindrical casing section and a casing end wall section having a plane central end wall and a truncated-cone shaped section interconnecting said central end wall and said cylindrical casing section, the base of said truncated-cone shaped section being connected to said cylindrical casing section;
    a circular reinforcement plate abutting against an inner surface of said central end wall, said plate being fastened to a selected one of a master brake cylinder and said vehicle by fastening bolts;
    reinforcement elements disposed in a selected one of said truncated-cone shaped section and said reinforcement plate extending in the direction of the base of said truncated-cone shaped section; and
    said reinforcement plate integrally including a prop ring disposed within said casing bearing against the inner surface of a circumferential edge of said casing at the transition from said truncated-cone shaped section into said cylindrical casing section.

2. A low-pressure casing shell according to claim 1, wherein
    said reinforcement elements include a plurality of depressions disposed in spaced relationship in said truncated-cone shaped section.

3. A low-pressure casing shell according to claim 2, wherein
    said reinforcement elements further include a plurality of webs disposed about the periphery of said reinforcement plate and extending in the direction of the base of said truncated-cone shaped section formed integrally with at least one of said reinforcement plate and said prop ring.

4. A low-pressure casing shell according to claim 3, wherein
    said webs are formed integrally with both of said reinforcement plate and said prop ring.

5. A low-pressure casing shell according to claim 1, wherein
    said reinforcement elements include a plurality of webs disposed about the periphery of said reinforcement plate formed integrally with at least one of said reinforcement plate and said prop ring.

6. A low-pressure casing shell according to claim 5, wherein
    said webs are formed integrally with both of said reinforcement plate and said prop ring.

7. A low-pressure casing shell according to claims 4 or 6, wherein
    said reinforcement plate, said webs and said prop ring are integrally formed from sheet metal.

8. A low-pressure casing according to claims 4 or 6, wherein
    said webs include rims folded toward the interior of said casing.

9. A low-pressure casing according to claim 8, wherein
    said webs have a U-shaped cross section.

10. A low-pressure casing shell according to claims 4 or 6, wherein
    said reinforcement plate includes deep-drawn ribs projecting towards the interior of said casing interconnected to form a lattice.

11. A low-pressure casing shell according to claim 10, wherein
    said reinforcement plate further includes a plurality of cup-shaped indentations projecting toward the interior of said casing, each of said indentations having a first bore in the bottom thereof positively engaging a head of a fastening bolt one surface of said head of said bolt being supported on a rim of a second bore in said central end wall, said bolt having a head plate fastened to another surface of said head of said bolt, said head plate bearing against a surface of the bottom of said indentation facing the interior of said casing.

12. A low-pressure casing shell according to claim 11, wherein
    said head of each of said fastening bolts includes a plurality of radial projections and one indentation provided on each side of each said projections, said projections engaging the inner surface of said first bore.

13. A low-pressure casing shell according to claims 4 or 6, wherein
    said reinforcement plate further includes a plurality of cup-shaped indentations projecting toward the interior of said casing, each of said indentations having a first bore in the bottom thereof positively engaging a head of a fastening bolt, one surface of said head of said bolt being supported on a rim of a second bore in said central end wall, said bolt having a head plate fastened to another surface of said head of said bolt, said head plate bearing against a surface of the bottom of said indentation facing the interior of said casing.

14. A low-pressure casing shell according to claim 13, wherein
    said head of each of said fastening bolts includes a plurality of radial projections and one indentation provided on each side of each of said projections, said projections engaging the inner surface of said first bore.

15. A low-pressure casing shell according to claims 4 or 6, wherein
said reinforcement plate, said webs and said prop ring are an integral piece.

16. A low-pressure casing shell according to claim 2, wherein
said reinforcement elements further include a plurality of webs spaced angularly about the periphery of said reinforcement plate to position said reinforcement plate bearing radially against said truncated cone-shaped end wall section.

17. A low-pressure casing shell according to claim 1, wherein
said reinforcement elements include a plurality of webs disposed about the periphery of said reinforcement plate bearing radially against said truncated cone-shaped end wall section.

* * * * *